(12) United States Patent
Levi et al.

(10) Patent No.: US 10,143,338 B2
(45) Date of Patent: Dec. 4, 2018

(54) MACHINE FOR PREPARING BEVERAGES WITH REMOVABLE FILTER HOLDER DEVICE AND ELEMENT FOR SELECTING AN OPERATION MODE OF THE MACHINE

(71) Applicants: Jean-Pierre Levi, Nice (FR); Mario Levi, Nice (FR)

(72) Inventors: Jean-Pierre Levi, Nice (FR); Mario Levi, Nice (FR)

( * ) Notice: Subject to any disclaimer, the term of this patent is extended or adjusted under 35 U.S.C. 154(b) by 252 days.

(21) Appl. No.: 14/902,708

(22) PCT Filed: Jun. 30, 2014

(86) PCT No.: PCT/EP2014/063826
§ 371 (c)(1),
(2) Date: Jan. 4, 2016

(87) PCT Pub. No.: WO2015/000834
PCT Pub. Date: Jan. 8, 2015

(65) Prior Publication Data
US 2016/0198887 A1    Jul. 14, 2016

(30) Foreign Application Priority Data
Jul. 5, 2013   (FR) ...................................... 13 56605

(51) Int. Cl.
*A47J 31/40*         (2006.01)
*A47J 42/40*         (2006.01)
(Continued)

(52) U.S. Cl.
CPC .............. *A47J 42/40* (2013.01); *A47J 31/404* (2013.01); *A47J 31/446* (2013.01); *A47J 31/0663* (2013.01)

(58) Field of Classification Search
CPC .......... A47J 42/40; A47J 31/404; A47J 31/446
See application file for complete search history.

(56) References Cited

U.S. PATENT DOCUMENTS

| 4,787,299 A | 11/1988 | Levi et al. | |
|---|---|---|---|
| 5,186,096 A * | 2/1993 | Willi .................... | A47J 31/36 |
| | | | 219/433 |

(Continued)

FOREIGN PATENT DOCUMENTS

| EP | 0280594 A1 | 8/1988 |
|---|---|---|
| FR | 1069975 A | 7/1954 |

(Continued)

OTHER PUBLICATIONS

English Translation for FR2827145 published Jan. 2003.*
International Search Report for corresponding International PCT Application No. PCT/EP/2014/063826 dated Aug. 14, 2014.

*Primary Examiner* — Anthony J Weier
(74) *Attorney, Agent, or Firm* — Hauptman Ham, LLP (57) ABSTRACT

A reception interface for a machine for preparing beverages by infusion from a ground product to be infused, wherein the interface removably receives by manual action of a user a filter-holder device for containing the ground product, wherein it includes a selection element that is movable from a rest position and configured to be reach one of a plurality of work positions each corresponding to a respective operation mode of the machine, wherein the selection element can moved into one or the other of the work positions by the filter-holder device when received in the reception interface. One or more embodiments of the invention also relate to a machine for preparing beverages as well as a method for operating such a machine.

20 Claims, 6 Drawing Sheets

(51) Int. Cl.
    *A47J 31/44*     (2006.01)
    *A47J 31/06*     (2006.01)

(56)          References Cited

U.S. PATENT DOCUMENTS

| 5,241,898 | A  | * | 9/1993 | Newnan ................. | A47J 31/42 |
|           |    |   |        |                          | 241/100    |
| 8,739,687 | B1 | * | 6/2014 | Tacklind ................. | A47J 31/42 |
|           |    |   |        |                          | 99/280     |
| 2005/0028677 | A1 |   | 2/2005 | Smit |  |
| 2012/0037008 | A1 | * | 2/2012 | Rodriguez .............. | A47J 31/06 |
|           |    |   |        |                          | 99/289 R   |
| 2012/0097040 | A1 |   | 4/2012 | Levi et al. |  |
| 2013/0164422 | A1 | * | 6/2013 | McCormick .......... | A47J 31/545 |
|           |    |   |        |                          | 426/433    |

FOREIGN PATENT DOCUMENTS

| FR | 1156557 A | | 5/1958 |
| FR | 2827145 | * | 1/2003 |
| WO | 2004/112554 A1 | | 12/2004 |

\* cited by examiner

MACHINE FOR PREPARING BEVERAGES WITH REMOVABLE FILTER HOLDER DEVICE AND ELEMENT FOR SELECTING AN OPERATION MODE OF THE MACHINE

FIELD

This invention relates to a machine that can be used during the preparation of beverages for preparing beverages with a ground product base to be infused, with this system advantageously constituted by a grinder for preparing the ground and by a machine for preparing beverages of the product to be infused, with the product advantageously but not only being coffee. The term infusion is to be taken in the broad sense, with the infusion able to be carried out, for example, by passing hot water in a filter filled with ground product and then being referred to as leaching or forced leaching.

In this field, and particularly for preparing so-called espresso coffees, a unit for the support of a dose of ground coffee, constituting a filter-holder device is commonly used. The filter-holder device comprises a grasping portion for the hand of a user in the form of a handle and a portion for receiving with a ground coffee filter within a filter-holder cup.

In the lower portion of the device, downstream of the filtering bottom of the cup, an outlet comprising one or several channels is constituted for the removal of the beverage made. This type of filter-holder device cooperates either with the reception interface of a coffee grinder for the loading with ground coffee of the device, or with the interface of a machine for preparing beverages for the injection of hot water through the ground and the making of the beverage. The filter-holder cup is configured to receive a predetermined quantity of ground coffee.

Generally, one, two or more coffee beverages can be produced simultaneously. The user, in particular a café owner, chooses the filter-holder device that comprises the cup suited for the number of beverages that he wants to make.

According to prior art shown in publication EP-A1-280 594, a system for detecting doses for a filter-holder device comprising a cup is provided. The technique implemented according to this prior art consists in using magnetic Hall effect sensors that make it possible, according to a predetermined encoding and according to a movement of placing into rotation of the filter-holder device, to identify a few different types of filter-holder devices.

Although providing general satisfaction, the device in question has certain limitations. Firstly, the number of types of filter-holder devices that can be detected is limited by the very construction of the sensor. This device cannot therefore be extended to detections in greater numbers in particular linked in addition to the volume of the ground coffee or to parameters for preparing the beverage which can vary according to the quality of the type of coffee.

On the other hand, if the characteristic relating to the number of beverages made in correspondence with a given filter-holder and therefore for example for is a specific quantity of ground to be produced by the grinder for the given filter-holder is the most frequent, this characteristic can be combined with or be replaced with one or other characteristics, with this other or these other characteristics able for example to relate to the finesse of the ground and/or one or several parameters concerning temperature and pressure of the machine for preparing beverages.

In such a case, there should be as many filter-holder devices with a different configuration as there are possibilities of combining different characteristics relative to the beverage or to the preparation of the beverage. This would therefore require a certain number of different filter-holder devices and would render such a detection of such characteristics difficult and even impossible to implement and especially unviable economically.

In addition, with this detection according to prior art, the user has no means of interfering in the selection as the latter is carried out entirely automatically therefore not requiring his participation.

The document FR-A-1.156.557 provides, in a machine for producing beverages of the coffee type, a device for actuating the starting of the producing of the beverage which is controlled by the setting in place of the infusion-holder cup. The system acts as a switch between two positions and therefore does not resolve the problem of the technique encountered hereinabove.

A problem at the base of this invention is to obtain during the setting into place of a filter-holder device on a machine for preparing beverages with a base of a product to be infused a selection of one of the characteristics of the product to be infused or of its method of preparation without this requiring a different filter-holder for each one of the possible characteristics, as these characteristics are plural.

SUMMARY

To this effect, according to the invention a reception interface for a machine for preparing beverages by infusion from a ground product to be is infused is provided, the interface removably receives by manual action of a user a filter-holder device for containing the ground product, characterised in that it comprises a selection element that is movable from a rest position and configured to reach so that it reaches one among several work positions each corresponding to a respective operation mode of the machine, the selection element able to be displaced to one or the other of the work positions by the filter-holder device when received in the reception interface.

The technical effect is the selecting of a mode of operation the machine combined with the action of the user manually placing the filter-holder device. As such, the use of a filter-holder device specific to a respective mode of operation is avoided. This makes it possible to simplify the management of filter-holder devices as well as generating savings on the manufacture of these various devices. The gesture to be carried out by the user is simple, the selection element arranged on the reception interface being easily accessible to the filter-holder device guided by the hand of the user being directed towards this interface for its positioning on the interface.

It must be noted that the invention has the advantage of allowing the user, easily, a selection from among several positions of the selection element which means that at least three positions can be reached (a rest position, and at least two work positions with each corresponding to a mode of operation the machine).

Moreover, the machine can comprise a button or other means of triggering in order to initiate the production of a beverage after setting into place of the filter-holder device selecting a work position. In another case, (the starting is automatically initiated once the selection of the work position is carried out.

Optionally, the invention further comprises at least one of any of the following characteristics:

the displacement of the selection element is a pivoting of the element with respect to one of its ends;

the selection element is in the form of a lever of which the head is pivotably mounted around a pivot attached to the interface;

said at least two work positions are obtained by pivoting in opposite is directions of the selection element around the rest position;

the selection element comprises a mechanical means of return to the rest position;

the means of return comprise a spring;

the means of return comprise an elastically deformable loop, with the loop passing through an anchoring point on the reception interface and at least one anchoring point on the selection element, the displacement of the selection element stretching said elastically deformable loop which returns to its unstretched form when no solicitation is applied to it;

the means of return comprises a magnetic member;

the invention comprises for each work position at least one means for detecting the passage of the election element into the work position;

the means for detecting is a microswitch;

the means for detecting is an electronic sensor in particular, of the Hall effect, inductive, capacitive, RFID or radio-identification, reed also called flexible blades, photoelectric, type, the sensor being carried by one among the selection element or the reception interface, with an additional element to the sensor being carried by the other among the interface or the element.

According to another object of the invention, a machine is provided for preparing beverages par infusion, characterised in that it comprises such a reception interface, with the interface being removable or not from the rest of the machine.

Advantageously, when at least one means of detection is provided for each work position, said at least one means for detecting being connected to a central unit of the machine, the central unit activating the mode of operation that corresponds to the work position reached by the selection element.

The machine on core body, can include a system for positioning a filter-holder device.

Advantageously, means for displaying a visual signal that indicate which mode of operation has been selected are provided.

In an embodiment of the invention, the machine is a coffee grinder comprising a hopper supported by a core body, with the reception interface arranged on the core body.

Advantageously, the reception interface and the selection element in rest position extend vertically on said machine or with an inclination downward of the machine in the longitudinal median plane of the machine by forming an acute angle in relation to the vertical.

In the framework of the invention, a method of operating such a machine for preparing beverages by infusion is provided, with the method comprising the following steps:

selecting a mode of operation the machine by action of the filter-holder device on the selection element and displacement of the latter in one of the work positions corresponding to said mode of operation, operating of the machine automatically with the selected mode of operation.

Advantageously, the methods of operating relate to the quantity of ground to be placed in the filter-holder device, the finesse or the quality of the ground or one or several operating parameters of the machine such as the temperature and/or the pressure of the water used for the infusion.

Advantageously, the method of operation selected can operate only after the detection of the reception of the filter-holder device in the reception interface.

Advantageously, a safety timer is set up between the selecting by the selection element of an operating mode and the starting of the machine with the selected mode of operation. The invention also relates to a system provided with a filter-holder device and with the interface or the machine.

BRIEF DESCRIPTION OF THE DRAWINGS

Other characteristics, purposes and advantages of this invention shall appear when reading the following detailed description and when examining the annexed drawings provided as non-limiting examples and wherein:

FIGS. 1, 2 and 3 diagrammatically show a front view of a machine for preparing beverages according to this invention provided with a filter-holder device for FIGS. 1 and 3 and without a filter-holder for FIG. 2, with the machine comprising a mobile selection element being respectively in a first work position, a rest position and a second work position in these figures, FIG. 4 diagrammatically shows a side view of the machine shown in FIG. 3, FIGS. 5, 6 and 7 diagrammatically show an enlarged view of the mobile selection element in the position of the element shown respectively in FIGS. 1 to 3, with FIG. 6 being furthermore enlarged in relation to FIGS. 5 and 7, with these figures showing a means of return to rest position of the selection element, FIGS. 8, 9 diagrammatically show an enlarged view of the mobile selection element according to this invention in another embodiment of its means of return than that shown in FIGS. 5 to 7, FIGS. 10 to 11 diagrammatically show an enlarged view of the mobile selection element according to this invention in an embodiment comprising microswitches as detectors of the position of the selection element, with FIG. 10 showing the rest position of the selection element while FIG. 11 shows one of the two work positions, FIG. 12 diagrammatically shows an enlarged view of the mobile selection element according to this invention in an embodiment comprising Hall effect sensors as detectors of the position of the selection element, with the selection element being in its rest position in this figure.

DETAILED DESCRIPTION

In reference to FIGS. 1 to 4, a machine for preparing beverages is described shown in a non-limiting manner by a grinder 10, to grind a product to be infused, advantageously in the form of coffee beans. The grinder 10 conventionally comprises a core body 12 and a hopper 11 for receiving and storing coffee beans.

Figure 4:
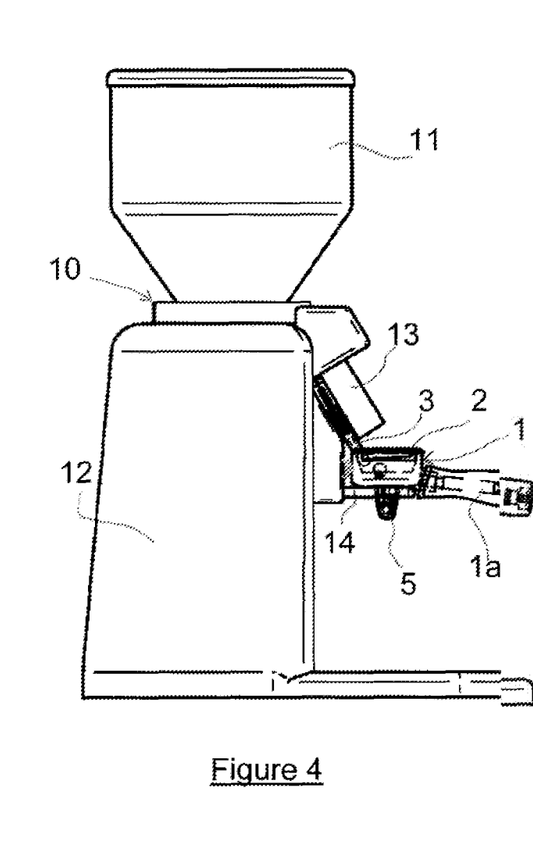

This grinder 10 makes it possible to produce a ground coffee delivered to a mouth forming a reception interface 13 for the cup 2 of a filter-holder device 1 positioned at this location, with this reception interface 13 being shown inclined downwards in FIG. 4, which is not limiting.

The filter-holder device 1 conventionally comprises a handle 1a as well as a cup 2 presenting a filtering bottom and able to receive in its inner volume a predetermined dose of ground coffee. In the lower portion, at the outlet of the liquid, the device 1 is provided with a beverage outlet 5 that can comprise one or several channels. There can be as many filter-holder devices 1 or alternatively as many cups with different volumes as there are quantities of ground desired.

For the reception of the filter-holder device 1 on the reception interface 13, more preferably at the lower portion of this interface 13, is formed here a system with two means (or members) for positioning the filter-holder device 1 such as two support members 14 here figured in the form of two parallel rods protruding towards the front of the grinder 10 showing the machine.

Figure 1:
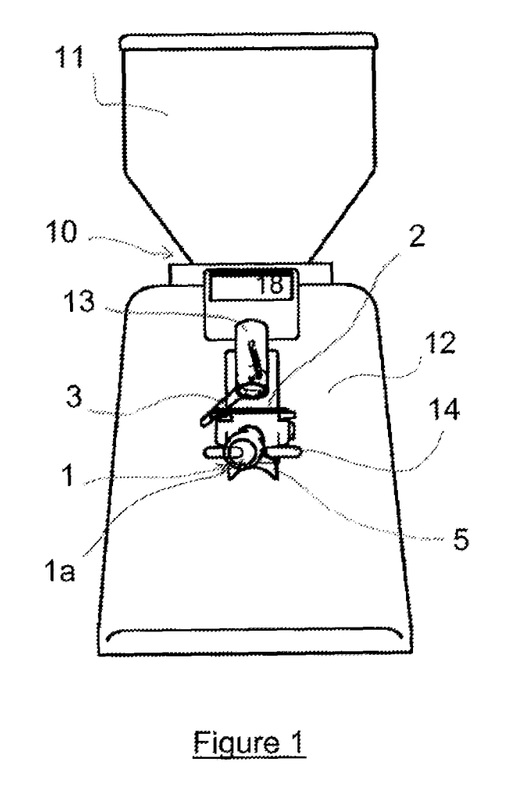
Figure 3:
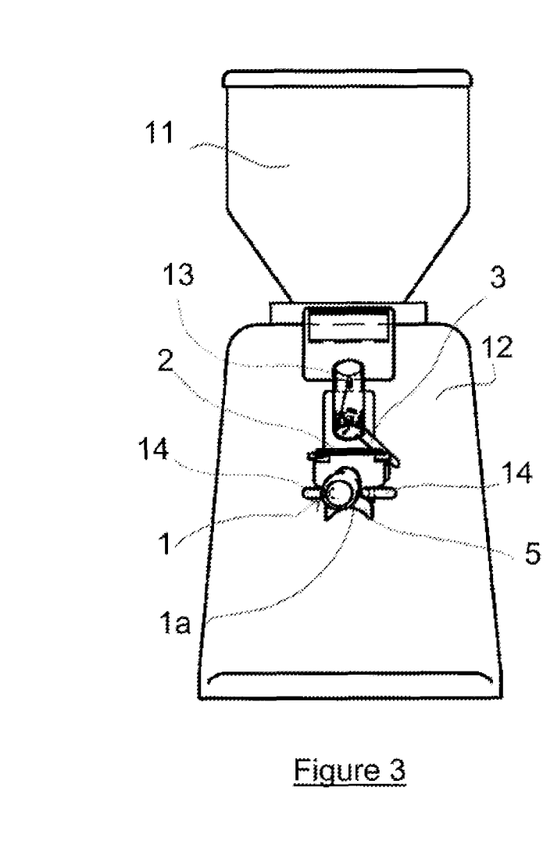

As can be seen in FIGS. 1, 3 and 4, these two support members 14 are applied onto a lower portion of the filter-holder device 1 in order to support it.

Advantageously, alternatively or in combination with these two reception members 14, two assembly bayonets can be provided that can be arranged at the periphery of the filter-holder device 1 at its upper portion. These assembly bayonets advantageously protrude beyond the wall of the filter-holder device 1 in order to construct elements for cooperating with the reception interface 13 of the coffee grinder 10 showing a machine for preparing beverages.

According to this invention, the machine for preparing beverages, in the figures shown by a coffee grinder 10, comprises a mobile selection element 3. This selection element 3 that is mobile is also shown enlarged in FIGS. 5 to 7.

Figure 2:
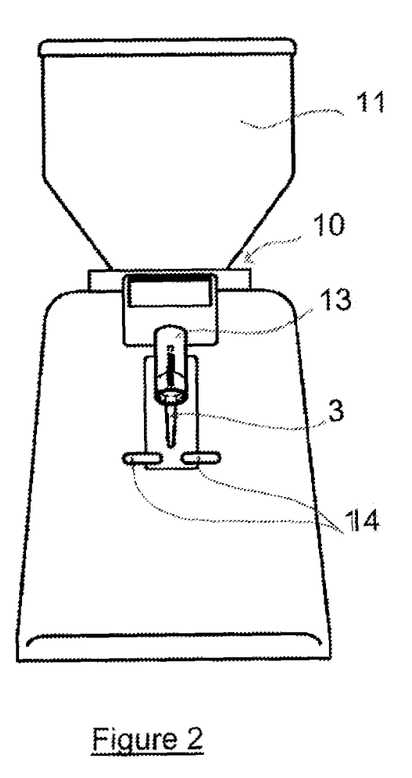

As can be seen in particular in FIGS. 1 to 3, this selection element 3 can be displaced in a first and in a second work position shown respectively in FIGS. 1 and 3, this starting from a rest position shown in FIG. 2. Work position means a selection position.

These work positions correspond respectively to a respective characteristic of the ground coffee, such as the quantity of ground coffee or the finesse of the grind or to a characteristic of producing the coffee such as the temperature or the pressure of the water used to make the coffee. The quantity of ground coffee is preferred.

The displacement in work position of the selection element 3 is carried out by the movement of the filter-holder device 1 towards the reception interface 13 and the grinder 10. It is the user who displaces the filter-holder device 1 in such a way that the selection element 3 is pushed into one of the two work positions.

In other embodiments of the selection element 3, there can be more than two work positions, with these positions being reached during a displacement but not necessarily maintained. As such, this can be only the reaching of a specific displacement which signals a work position and not only the retaining of it.

Figure 5:
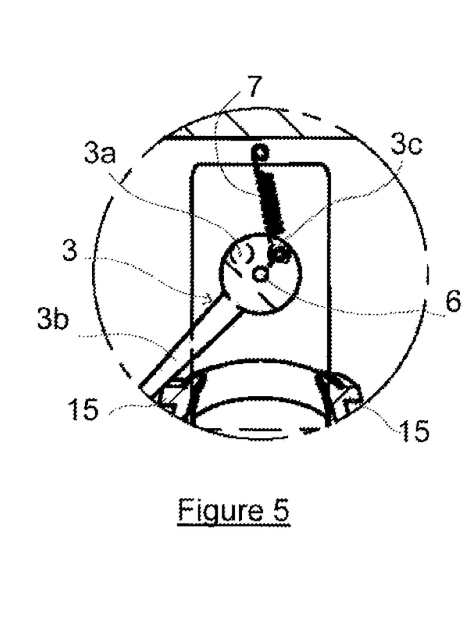
Figure 6:
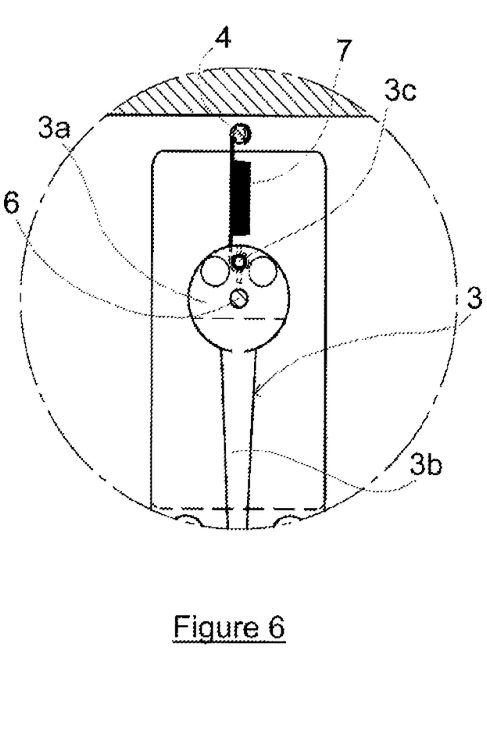
Figure 7:
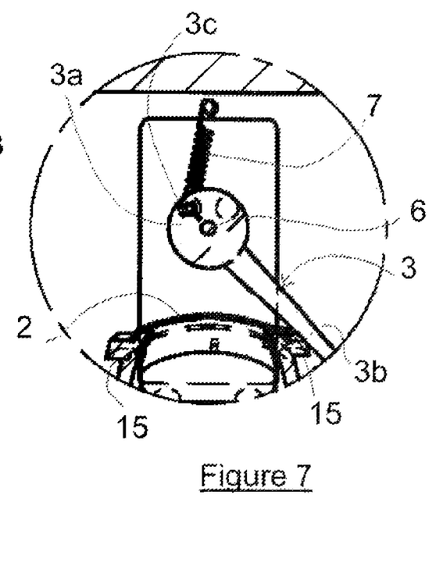

As can be seen in FIGS. 5 to 7, the displacement into work position of the selection element 3 can be done through pivoting. To do this, advantageously the selection element 3 has a head 3a and a lever 3b. The head 3a, advantageously substantially circular, is articulated at its centre around a pivot 6.

In the figures, the selection element 3, in particular its lever 3b, extends in an inclined manner downwards. This is not limiting and the selection element 3 can also extend vertically by being pivotable around a horizontal pivot 6. In this embodiment the selection element 3 follows the inclination of the reception interface 13 by extending into the longitudinal median plane of the machine 10 in the rest position and can be pivoted in a plane perpendicular to this longitudinal median plane in at least one selection position.

If preferably, the reception interface 13 and the selection element 3 extend vertically on said machine 10 or with an inclination that has an acute angle in relation to the vertical by extending into the longitudinal median plane of the machine 10, it is possible that the selection element 3 extends horizontally by being pivotable around a vertical pivot.

A movement other than a pivoting for the passage into one of the at least two positions is also possible, with the essential being that it is the manual displacing of the filter-holder device 2 towards the grinder 10 under a specific action of the user that places the selection element 3 in one of the work positions.

Advantageously, still as shown in FIGS. 5 and 7, the selection element 3 is maintained in first or second work position by the presence of the filter-holder device 1 then made integral with the grinder 10. The filter-holder device 1 can carry at the upper portion of its periphery lugs 15 that act as abutment elements for the selection element 3, with each one of the lugs 15 corresponding to a specific work position.

The selection element 3 comprises a means of return into its rest position, a means which can have several configurations. A first group of means to return is formed by mechanical means of return while a second group of means of return is formed by magnetic means.

In a first embodiment shown in FIGS. 5 to 7, this means of return is in the form of a return spring 7, advantageously helical, of which one end is connected at an anchoring point 3c to the head 3a of the selection element 3 and the other end is fastened to an anchoring point 4 that is fixed in relation to the reception interface or to the core body of the machine.

The spring 7 is as such subjected to a force of traction when the selection element 3 takes one of the at least two work positions and is therefore returned to the rest position as soon as nothing opposes this return movement.

Figure 8:
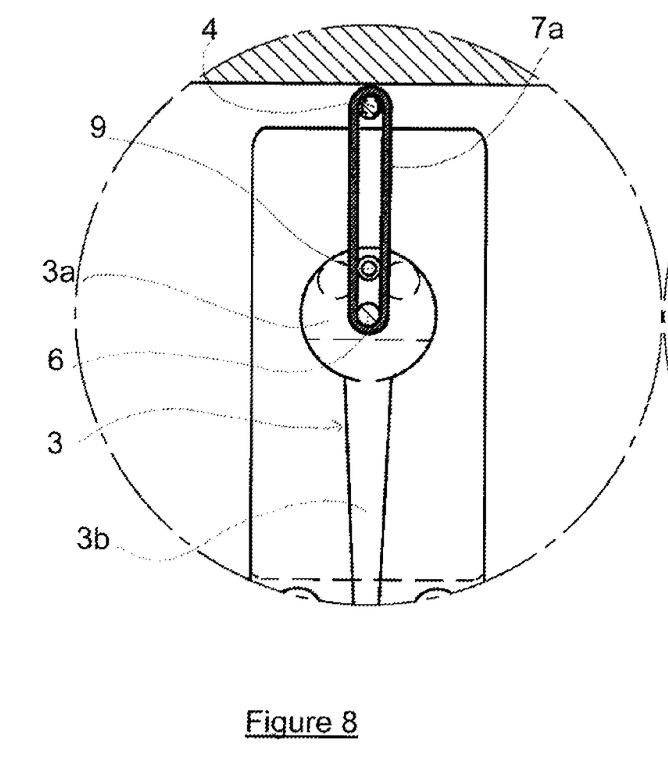
Figure 9:
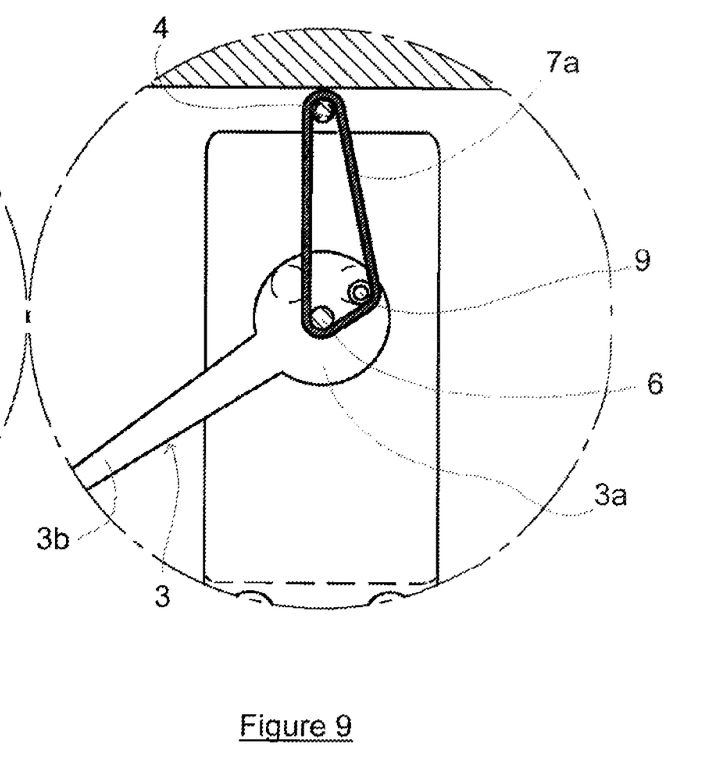

Another embodiment of a mechanical means of return of the selection element 3 into its rest position is shown in FIGS. 8 and 9. In this embodiment, the means of return is in the form of a deformable loop 7a with a first portion of the loop 7a partially surrounding the anchoring point 4 with the reception interface or the core body of the machine. A second portion of the loop 7a partially surrounds the pivot 6 of the selection element 3, the pivot 6 and the anchoring point 4 acting as a return point of the loop 7a.

In this embodiment, the head 3a of the selection element 3 carries a nipple 9, with the nipple 9 located between the pivot 6 and the anchoring point 4 in rest position of the selection element 3, as shown in FIG. 8. During the pivoting movement of the selection element 3, shown in FIG. 9, the nipple 9 is no longer aligned with the pivot 6 and the anchoring point 4.

The nipple 9 is then used as a third point of return of the deformable loop 7a with a third portion of the loop 7a partially surrounding the nipple 9: the loop 7a is then stretched and naturally returns to its unstretched position when nothing opposes this return.

As mentioned hereinabove other types of a means of return can be used. The means of return of the selection element 3 can be mechanical, such as a traction spring, deformable loop or a spring of the clothespin type.

However, a magnetic means of return without contact is also possible. Finally, for a selection element 3 with an inclined or horizontal axis, a return to rest position of the selection element 3 via its own weight due to gravity can also be considered.

Figures 10, 11:
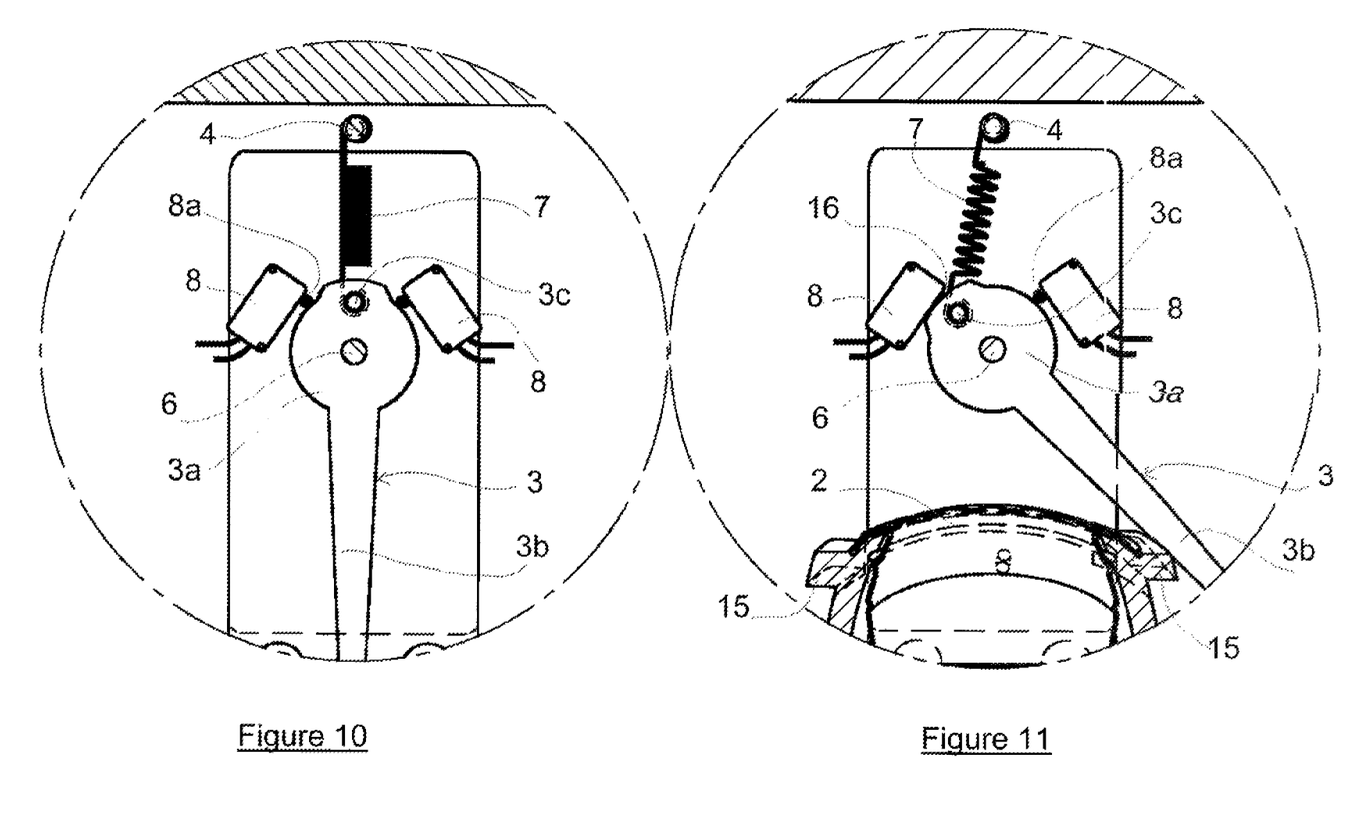

FIGS. 10 and 11 show microswitches 8 as detectors of the position of the selection element 3 in one of its work positions. In the embodiment shown in these figures, there are two work positions that correspond to a pivoting respectively in the clockwise and anti-clockwise direction of the selection element 3 comprising a lever 3a and a head 3c pivoting around a pivot 6. A microswitch 8 is provided for each work position. Each microswitch 8 is arranged on a respective side of the head 3a of the selection element 3.

Each microswitch 8 has a retractable tip 8a which provokes the detection of the position of the selection element 3 when pressed by the latter. For this, the head 3a of the selection element 3 has a protruding portion 16, advantageously similar to a cam profile, with this portion 16 able to enter into contact with the tip 8a of the microswitch 8 and press it to retract it and provoke the detection signal of the work position.

Alternatively to the protruding portion 16, concave portions can be provided on the head 3a of the selection element 3 facing the microswitches 8 when the selection element 3 is in rest position, with a microswitch 8 encountering a non-concave portion on the head for the detecting of a work position.

The protruding portion 16 is located in rest position of the selection element 3 between the two microswitches 8 in order to be able to interact symmetrically and selectively with the two microswitches 8 during either a clockwise or anti-clockwise rotation of the selection element 3. In FIG. 10, in the rest position of the selection element 3, the tip 8a of each microswitch 8 is not retracted.

In FIG. 11, the selection element 3 has pivoted in the anti-clockwise direction around the pivot 6 and the protruding portion 16 has contacted one of the microswitches 8, the one diametrically opposite, by taking as a centre the pivot 6, at the lever 3b of the selection element 3, and has retracted the tip 8a of this microswitch 8 for the detecting of the work position.

Generally, as there are at least two work positions, the use of at least two detection sensors is required. Any type of sensor can therefore be used not only a set of at least two microswitches.

For example, these sensors can be electronic without contact, for example a Hall effect sensor, an inductive sensor, a capacitive sensor, an RFID or radio-identification sensor, a reed sensor or sensor with flexible blades, photoelectric sensor, etc. In these cases, the selection element 3 is to be provided with an element that can be detected by the electronic sensor, for example a magnet for the Hall effect sensor.

Figure 12:
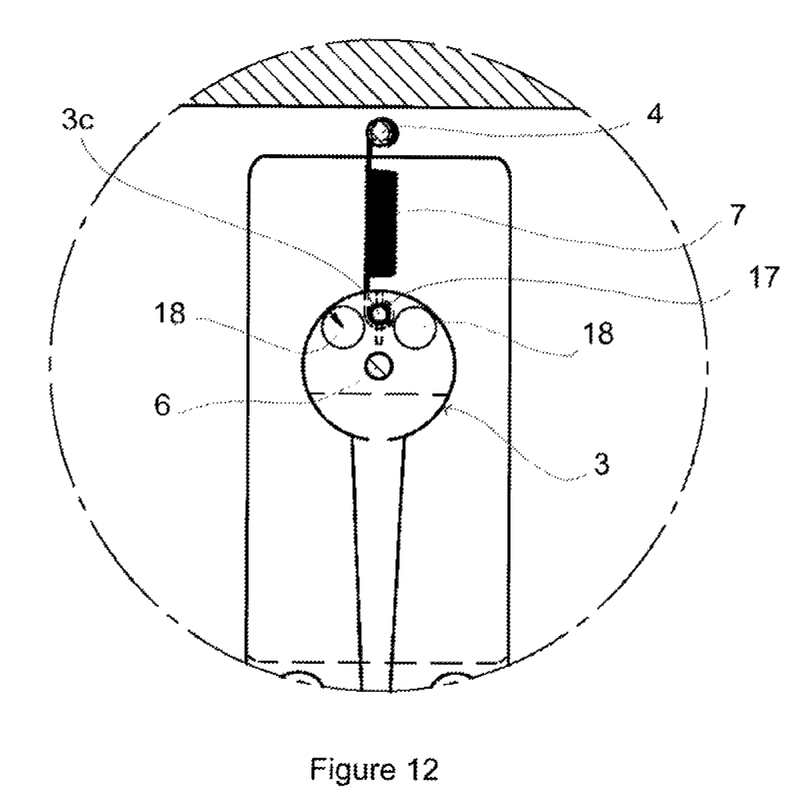

FIG. 12 shows another embodiment of the detecting of the work position of the selection element 3. This detection is then done via the Hall effect. The head 3a of the selection element 3 then carried a magnet 17. This magnet 17 during the pivoting of the selection element passes in the vicinity of at least one Hall effect sensor 18, advantageously above or below the sensor.

The positioning of the Hall effect sensor 18 corresponds to a work position of the selection element 3 in order to allow for the detection of the selection element in this work position. A Hall effect sensor 18 is provided for each work position, most frequently numbering two but able to be more than two.

Advantageously, the two work positions of the selection element 3 are symmetrical and the magnet 17 is located between the two work positions therefore between the two Hall effect sensors. Advantageously, this magnet 17 is confounded with the anchoring point 3c of the return spring 7 present on the head 3a of the selection element 3 when the latter is present, which is not always the case, with another means of return also able to be used in association with one or several electronic sensors.

By referring to all of the figures, the invention also relates to a method of operation of a machine 10 for preparing beverages by infusion, with the method comprising the step of selecting a mode of operation of the machine 10 by action of the filter-holder device 1 on the selection element 3 and displacement of the latter in one of the work positions corresponding to said mode of operation and the step of starting the machine 10 with the selected mode of operation.

The mode of operation, for example a starting of ground starting from the hopper of a grinder, is advantageously effective after reception of two pieces of information. The first piece of information is provided by the position of the selection element which will activate one of the dose sensors according to the choice of the user. The second piece of information is provided by the starting sensor of the ground by actuating of the sensor by the filter-holder device 1, for example directly actuated by the cup of the filter-holder device 1.

Generally, the mode of operation selected can be operated only after detection of a suitable reception of the filter-holder device 1 in the reception interface 13.

Advantageously, a timer is set up between the selection by the selection element 3 of a mode of operation and the starting of the machine 10 with the selected mode of operation. This time makes it possible to prevent in the event of a false manipulation a starting of the machine 10 with a mode of operation chosen in error.

Means for displaying a visual signal that indicate which mode of operation the machine has been selected can be provided on the machine.

The invention is in no way limited to the embodiments described and shown which were provided only as examples.

REFERENCES

1. Filter-holder device
1a. Handle
2. Cup
3. Selection element
3a. Head
3b. Lever
3c. Anchoring point
4. Anchoring point
5. Beverage outlet
6. Pivot
7. Return spring
7a. Deformable loop
8. Microswitch
8a. Tip
9. Nipple
10. Grinder
11. Hopper
12. Core body
13. Reception interface
14. Support member
15. Lug
16. Protruding portion
17. Magnet
18. Hall effect sensor

The invention claimed is:

1. A reception interface for an infused beverage preparation machine, the interface removably receiving by manual action of a user a filter-holder device for containing a ground product, the reception interface comprising a selection element that is movable from a rest position and configured to reach one of a plurality of different work positions each corresponding to a respective operation mode of the machine chosen among plural operation modes, with each work position differing from the rest position, wherein the selection element is movable through a displacement towards one or the other of the work positions by the filter-holder device when received in the reception interface, and wherein the reception interface comprises for each work position at least one position detection sensor configured to detect that the selection element is in said work position.

2. The reception interface according to claim 1, wherein the displacement of the selection element is a pivoting of the element with respect to one end thereof.

3. The reception interface according to claim 2, wherein the selection element is in the form of a lever of which the head is pivotably mounted around a pivot attached to the interface.

4. The reception interface according to claim 2, wherein the plurality of different work positions comprises a first work position and a second work position and wherein the first work position is reached by pivoting the selection element from the rest position in a first direction, and wherein the second work position is reached by pivoting the selection element from the rest position in a second direction that is opposite the first direction.

5. The reception interface according to claim 1, wherein the selection element is biased to return to the rest position.

6. The reception interface according to claim 1, further comprising a spring and wherein the selection element is connected with the spring to bias the selection element to the rest position.

7. The reception interface according to claim 5, further comprising an elastically deformable loop and wherein the selection element is connected with the elastically deformable loop, with the loop passing through an anchoring point on the reception interface and at least one anchoring point on the selection element, the displacement of the selection element stretching said elastically deformable loop.

8. The reception interface according to claim 5, further comprising a magnetic member and wherein the selection element is connected with the magnetic member.

9. The reception interface according to claim 1, comprising for each work position at least one position detection sensor configured to detect the passage of the selection element into the work position.

10. The reception interface according to claim 9, wherein the position detection sensor is a microswitch.

11. The reception interface according to claim 9, wherein the position detection sensor is one or more electronic sensors comprising a first electronic sensor being carried by one among the selection element and a portion of the reception interface which is fixed relative to the selecting element, and an additional sensor being carried by the other among the selection element and the portion of the reception interface.

12. An infused beverage preparation machine comprising a reception interface according to claim 1, with the interface being movable from the rest of the machine.

13. The machine according to claim 12, wherein said at least one means of detection is connected to a central unit of the machine, the central unit activating the mode of operation corresponding to the work position reached by the selection element.

14. The machine according to claim 12 comprising a selector system for positioning the filter-holder device.

15. The machine according to claim 12, wherein the infused beverage preparation machine is a coffee grinder comprising a hopper supported by a core body, the reception interface being arranged on the core body.

16. The machine according to claim 12, wherein the selection element in the rest position extends vertically or with an inclination downwards a core body of the machine in a longitudinal median plane of the machine by forming an acute angle in relation to a vertical direction.

17. A method of operating a machine according to claim 12, the method comprising:
  selecting a mode of operation of the machine by action of the filter-holder device on the selection element and displacement of the latter in one of the different work positions corresponding to said operation mode; and
  starting an infusion step from a ground product to be infused or a coffee grinding step automatically after one of the operation modes is selected.

18. The method according to claim 17, wherein at least two of the operation modes differ in at least one operating parameter of the machine chosen among: a quantity of ground coffee to be ground in the filter-holder device during the coffee grinding step, a grind type of ground coffee to be ground during the coffee grinding step, or one or several operating parameters of the machine during the infusion step and selected among a temperature or a pressure of water used.

19. The method according to claim 17, wherein the selected operation mode is operated only after detection of reception of the filter-holder device in the reception interface.

20. The method according to claim 17, wherein a safety timer is set up between the selecting and the starting.

* * * * *